United States Patent [19]

Maruta et al.

[11] 4,099,029

[45] Jul. 4, 1978

[54] ASYNCHRONOUS PCM COMMON DECODING APPARATUS

[75] Inventors: Rikio Maruta; Yasuo Itoh; Atsushi Tomozawa, all of Tokyo, Japan

[73] Assignee: Nippon Electric Co., Ltd., Tokyo, Japan

[21] Appl. No.: 760,790

[22] Filed: Jan. 19, 1977

[30] Foreign Application Priority Data

Jan. 20, 1976 [JP] Japan .................................. 51-5328
Jan. 20, 1976 [JP] Japan .................................. 51-5329
Jan. 20, 1976 [JP] Japan .................................. 51-5330

[51] Int. Cl.² ............................................ H04J 6/02
[52] U.S. Cl. .................................. 179/15 BA; 178/50
[58] Field of Search ........ 179/15 AS, 15 BW, 15 BA; 178/50

[56] References Cited

U.S. PATENT DOCUMENTS

| | | | |
|---|---|---|---|
| 2,920,143 | 1/1960 | Filipowsky | 179/15 BA |
| 3,632,882 | 1/1972 | Gecierski | 179/15 BA |
| 3,790,715 | 2/1974 | Inose | 179/15 BA |

OTHER PUBLICATIONS

Comsat Technical Review; vol. 6, No. 1, pp. 127–158, Spring 1976; "Digital Speech Interpolation," by S. J. Campanella.

Primary Examiner—David L. Stewart
Attorney, Agent, or Firm—Sughrue, Rothwell, Mion, Zinn and Macpeak

[57] ABSTRACT

An asynchronous PCM common decoding apparatus decodes asynchronous PCM signals sent from a plurality of transmitter sources. The apparatus includes a plurality of receiver units each of which generate a digital signal to be decoded, a channel-number-designating signal, and a decode-requesting signal. One or more decoders are provided to decode the digital signals from the receiver units to analog signals. The decoders produce status signals indicating availabilities of the decoders for decoding the digital signals. A common control unit is responsive to both the decode-requesting signals and the status signals to successively allot a combination of a given receiver and a given decoder.

11 Claims, 10 Drawing Figures

ASYNCHRONOUS PCM COMMON DECODING APPARATUS

BACKGROUND OF THE INVENTION

The present invention relates to an asynchronous PCM common decoding apparatus for decoding asynchronous PCM (pulse code modulation) signals sent from a plurality of transmitter sources.

In satellite communication, an FM (frequency modulation)/FDMA (frequency division multiple access) system is employed, in which speech signals are transmitted as frequency-division multiplexed signals after they have been used to FM-modulate a carrier. In place of performing such analog transmission, it is also possible to encode the speech signals into PCM signals at first and to transmit them as frequency division multiplexed signals after subjecting them to PSK (phase shift keying) modulation.

In the case where a PSK carrier wave transmitted from a given transmitting station comprises only speech signals (hereinafter referred to simply as signals) destined for one particular station, such PCM transmission according to FDMA systems can be realized in exactly the same manner as the conventional PCM transmission. However, in the case where there are signals destined for many stations and also the number of channels per one station is small, the multi-destination operation in which signals destined for many stations are multiplexed and comprised in one PSK carrier wave is more economical. Especially, in order to employ digital speech interpolation (DSI), it is essentially necessary that the number of channels is gathered to a certain extent, and in view of such aspects, the multidestinational operation becomes indispensable.

In FIG. 1 which shows a schematic block diagram of one example of the prior art systems, a communication system is operated on a multidestination basis among three stations represented by reference numerals 1, 2 and 3.

In a transmitter 10 of a station 1, input signals 100 are PCM encoded and time division multiplexed, and then, they are transmitted to stations 2 and 3. On the other hand, signals sent from the stations 2 and 3 are received and decoded in the station 1 by receivers 11 and 12, respectively. Among the signals received from the respective stations and decoded, extracted signals destined for its own station are output signals 101. Naturally, the number of the output signals 101 is equal to that of the input signals 100. Operations in the stations 2 and 3 are carried out similarly to the case of the station 1.

The reason why receiver units equal in number to the communicating stations are required in each station, is because the respective stations are operated by clock sources asynchronous to each other. Further, the reason why such asynchronous clock sources must be used, is because in an FDMA communication system there is not provided special equipment for synchronizing the clock sources in the respective stations, and as a result, the respective received signals are asynchronous to each other.

When the number of the communicating stations is large and the number of channels for each station is relatively small, by means of the above-described prior art systems, the economical advantages obtained by the multidestinational operation cannot be expected so much.

While one example of the above-described prior art system is found in an article by R. C. Davis and R. J. F. Fang entitled "CHANNEL CAPACITY EXTENSION VIA FDMA/PSK/DSI" p.p. 170–179 (especially page 172) and read at the "Third International Conference on Digital Satellite Communications" held on Nov. 11–13, 1975 in Kyoto, JAPAN, a detailed system construction has not been proposed therein.

SUMMARY OF THE INVENTION

It is one object of the present invention to provide an asynchronous PCM common decoding apparatus free from the above-mentioned disadvantages of the prior art systems and capable of making economical multidestinational operations possible.

Another object of the present invention is to provide an asynchronous PCM common decoding apparatus capable of receiving a plurality of digital signals asynchronous to each other and capable of decoding the received signals by means of a common decoder.

The present PCM common decoding apparatus in which a plurality of time division multiplexed digital signals asynchronous to each other are received and decoded, is comprised of a plurality of receiver units each of which generates at its output a digital signal to be decoded, a channel-number-designating signal for designating the number of the channel to which an analog signal obtained from the decoding of said digital signal is to be fed, and a decode-requesting signal for requesting the decoding of said digital signal, one or more decoders each of which produces at its output a status signal for representing that said digital signals given from said receiver unit are acceptable, and a common control unit responsive to said request signals given from said receiver units and said status signals given from said one or more decoders for successively allotting a combination of a given receiver and a given decoder and for sending a data transfer command signal to the allotted receiver unit so that said digital signal to be decoded and said channel-number designating signal for designating the number of the channel may be transferred from the allotted receiver unit to the allotted decoder and also sending a decode command signal to said decoder.

BRIEF DESCRIPTION OF THE DRAWINGS

Now the invention will be described in more detail in conjunction with the accompanying drawings, in which.

DESCRIPTION OF THE PREFERRED EMBODIMENTS

Figure 2:
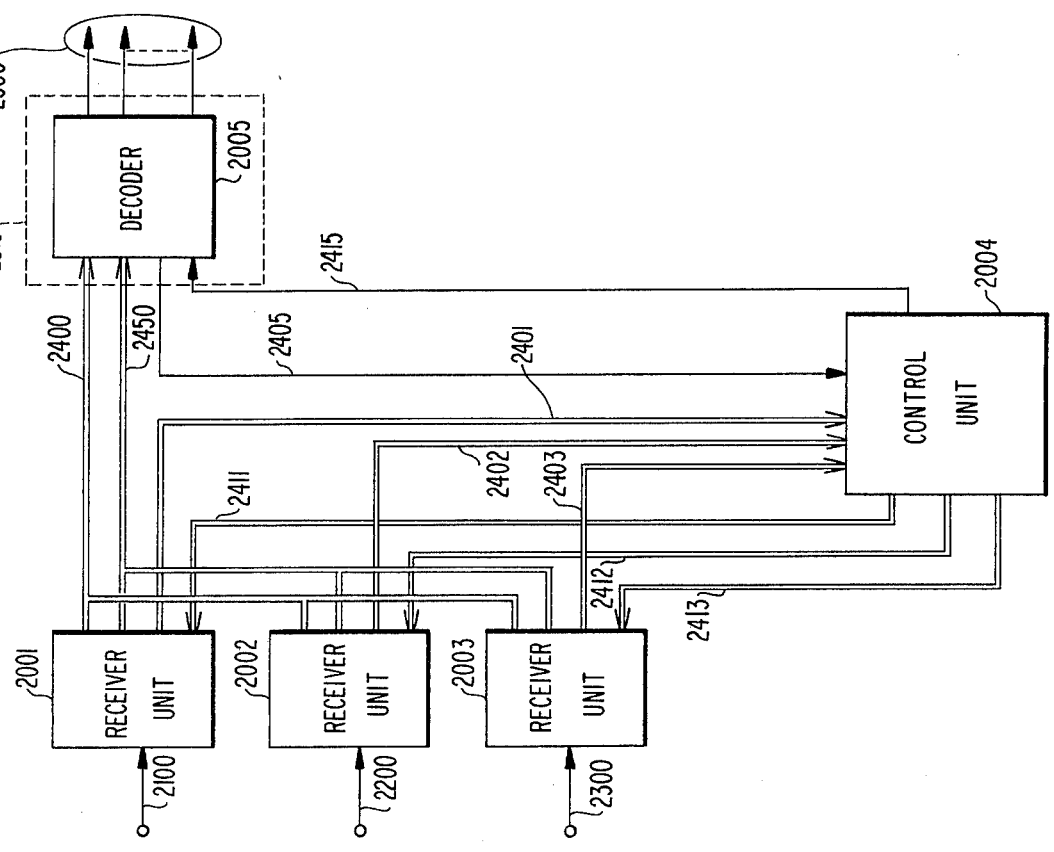
FIG. 2 shows a first embodiment of the present invention.
Figure 1:
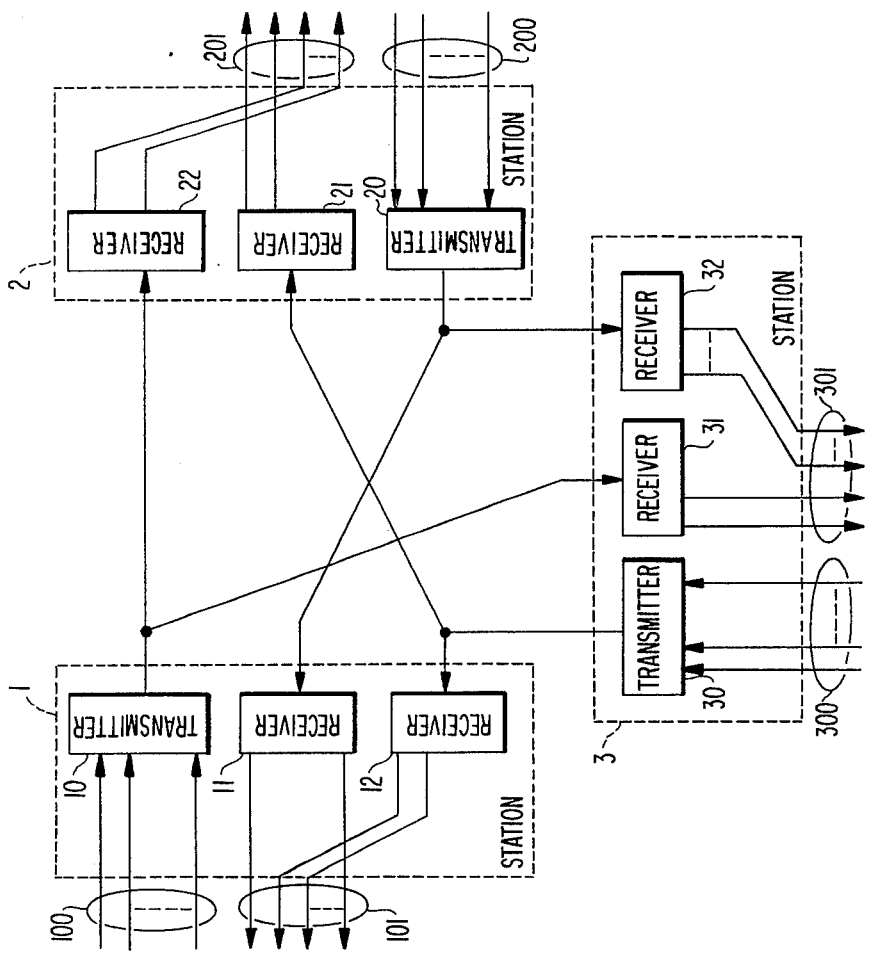
FIG. 1 shows a schematic block diagram of one example of multidestinational operation of communication system in the prior art.

In FIG. 2, the present asynchronous PCM common decoding apparatus includes receiving signal input terminals 2100, 2200 and 2300, receiver units 2001, 2002 and 2003, a common control unit 2004, and a common decoder unit 2010 including a decoder 2005. In addition, in the same figure, reference numeral 2500 represents output signals. The receiver units 2001, 2002 and 2003 and the common decoder unit 2010 (decoder 2005) are connected through a common PCM bus line 2400 and a common channel bus line 2450. To the common control unit 2004 are applied decode request signals from the respective receiver units via signal lines 2401, 2402 and 2403, respectively, and also a decode ready signal is given thereto from the decoder 2005 through a signal line 2405. The control unit 2004 decides a combination of one receiver unit 2001, 2002 or 2003 and the decoder 2005 while monitoring the decode request signals and the decode ready signal, and according to the results of the decision, it sends a data transfer command signal to the corresponding receiver unit via a signal line 2411, 2412 or 2413 and also sends a decode command signal to the decoder 2005 through a signal line 2415. From the receiver unit supplied with the data transfer command signal are sent PCM data through the common PCM bus line 2400, and is sent a signal representing the number of the channel to which the PCM data are to be fed after decoding through the common channel bus line 2450. In the decoder 2005 fed with the decode command signal, the PCM data on the common PCM bus line 2400 are decoded, and the decoded signals are given to the channel designated by the common channel bus line 2450.

In the following description, the construction of the decoder will be explained first, and then the constructions of the receiver unit and the common control unit will be described in detail with respect to the case illustrated in FIG. 2 where only a single decoder is used. Thereafter, the constructions of the receiver unit and the common control unit in case that the common decoder unit is composed of a plurality of decoders, will be explained.

Figure 3:
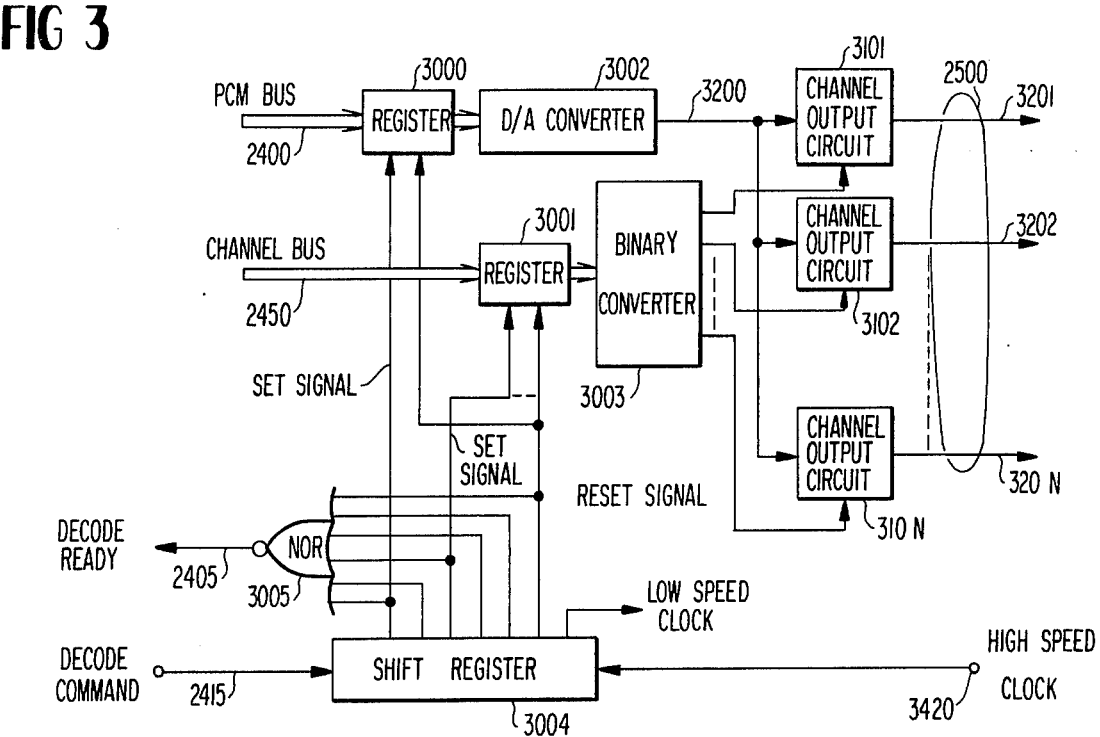
FIG. 3 shows a more detailed representation of a decoder 2005 in a common decoder unit 2010 of FIG. 2.

In FIG. 3 which shows a detailed construction of the decoder 2005 of FIG. 2, reference numerals 2400 and 2450 correspond to the common PCM bus line 2400 and the common channel bus line 2450, respectively, in FIG. 2, and through these bus lines the PCM data and the channel number are fed to the decoder 2005. Reference numerals 3420 designates a high speed clock input terminal, and reference numerals 3201, 3202, ... and 320N designate output signal lines for the respective channel signals. In addition, the above-described decoder 2005 is composed of registers 3000 and 3001, a digital-to-analog (D/A) converter 3002, a binary decoder 3003, a shift register 3004, a NOR gate 3005, and channel output circuits 3101, 3102, ... and 310N for a multiplexed PAM (pulse amplitude modulation) signal forming the output signal of the D/A converter 3002 each of which consists of a known transfer gate and a low-pass filter.

As soon as an input signal (decode command signal) is given to the decoder 2005 through a signal line 2415, in the shift register 3004, the input signal is successively shifted therethrough in response to high speed clock signals given to the terminal 3420. The number of stages of the shift register 3004 is determined by what is necessary for decoding one PCM datum. Since the result of NOR logic for the output signals fed from all the stages except for the last stage of the shift register 3004 appears from the NOR gate 3005, the emission of the decode ready signal through the signal line 2405 is inhibited during the period when the above-mentioned decode command signal is given to the register 3004 through the signal line 2415, and subsequently, when the decode command signal is given to any one input terminal of the NOR gate 3005. Accordingly, during this period of time, the decode command signal does not appear again on the signal line 2415. In other words, the highest decoding speed is expressed as follows: [(a high speed clock frequency) ÷ (the number of inputs to NOR gate 3005 plus 1)]. This decoding speed must be such a high speed that all the channel signals destined for its own station can be processed in one frame. This highest decoding speed is called "low speed clock". The low speed clock may be conveniently derived from the last stage of the shift register 3004.

Output signals from the predetermined stages of the shift register 3004 serve as a set signal or a reset signal for the register 3000 or 3001. By the supply of the decode command signal to the decoder 2005, in response to the above-described set signals, the PCM data and the channel number are stored first in the registers 3000 and 3001, respectively, through the bus lines 2400 and 2450. Thereafter, when a predetermined period has elapsed, the registers 3000 and 3001 are reset by said reset signals given from the shift register 3004. Once the PCM data are stored in the register 3000, the contents of the register are decoded into a PAM signal by the D/A converter 3002, and supplied as inputs of the channel output circuits 3101, 3102, ... and 310N through a signal line 3200. On the other hand, the channel number stored in the register 3001 is fed to the binary decoder 3003, and thence a demultiplex command pulse is sent to a channel output circuit corresponding to the channel number. As a result, the PAM signal on the signal line 3200 is recovered into an analog continuous waveform in the designated channel output circuit. In other words, if a decoder as shown in FIG. 3 is employed, then decoding on a demand basis is made possible distinctly from a decoder in the conventional PCM terminal equipment, and thereby asynchronous decoding can be achieved easily.

Now the construction of the receiver unit will be explained with reference to FIG. 4. This receiver unit includes a reception timing circuit 4001, a serial-to-parallel converter 4002, a speech buffer memory 4003, a write address generator 4004 and a read address generator 4005. In the reception timing circuit 4001, a timing signal necessary for regulating bit timing and frame synchronization and for writing a received signal in the speech buffer memory 4003, is generated. In the serial-to-parallel converter 4002, the received serial data are converted into parallel codes representing a coded value of the sampled amplitude on the basis of the timing signal fed from the reception timing circuit 4001. These parallel signals are written in the speech buffer memory 4003 at an address designated by the write address generator 4004. The buffer memory 4003 has a double-stack memory structure of sufficient capacity for storing one frame of information destined for its own station, and the respective stacks 4013 and 4023 of the double-stack memory are used by switching alternately between a write mode and a read mode for every frame. Namely, when the memory stack 4013 is in the write mode, the other memory stack 4023 is in the read mode, and when the memory stack 4013 is in the read mode, the other memory stack 4023 is in the write mode. This mode switching is carried out in response to frame pulses 4300 given from the reception timing circuit 4001.

The write address generator 4004 designates information in which time slots in a frame of a received signal should be written at what address in the speech buffer memory 4003, and it can be realized by means of a known read only memory (ROM) whose address is designated by a time slot designation signal fed from the reception timing circuit 4001. Alternatively, it could be constructed by means of a known random access memory (RAM) so that the memory contents may be changed at an arbitrary time. In a digital speech interpolation (DSI) terminal station, the latter method is employed and the contents of the random access memory are changed by the data transmitted from a transmitter section.

A novel feature of the receiver unit used in the present invention is found in the method for reading out the speech buffer memory 4003 as described hereunder. The reading out operation of the memory 4003 is carried out in response to an read-out address fed from the read address generator 4005 through a signal line 4310 and an output enable signal fed through a signal line 4320. In other words, when the output enable signal 4320 is sent to the speech buffer memory 4003, data stored in the memory 4003 at the address then designated by the signal line 4310 are sent to the common PCM bus line 2400. Simultaneously, the signal for representing the number of the channel to which the data on the common PCM bus line 2400 are to be taken out after decoding appears on the common channel bus line 2450. The appearance of the above-mentioned output enable signal shows that the bus line 2400 and the bus line 2450 are electrically disconnected from the speech buffer memory 4003 and the read address generator 4005, respectively. The output enable signal is generated when the data transfer command signal is fed through the signal line 2411. Immediately after the read-out operation of all the data has been completed, the decode request signal fed to the common control unit 2004 of FIG. 2 through the signal line 2401 is turned "OFF", and consequently, the data transfer command signal is not generated. However, if a new frame pulse appears on the signal line 4300 when the frame of the received signal has been renewed, the read address generator 4005 is reset to its initial state to commence its operation again. The generator 4005 is somewhat different in construction depending upon whether the common decoder unit 2010 consists of only a single decoder or a plurality of decoders.

Figure 4:
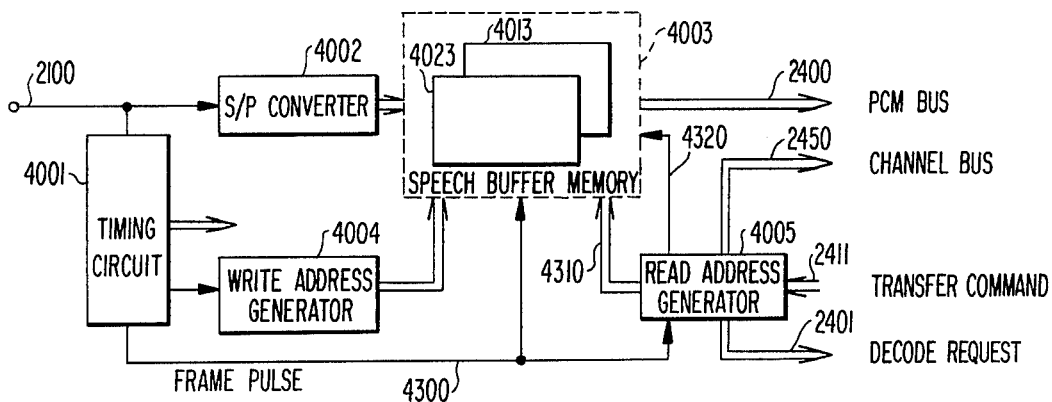
FIG. 4 shows a more detailed representation of one of the receiver units of FIG. 2.
Figure 5:
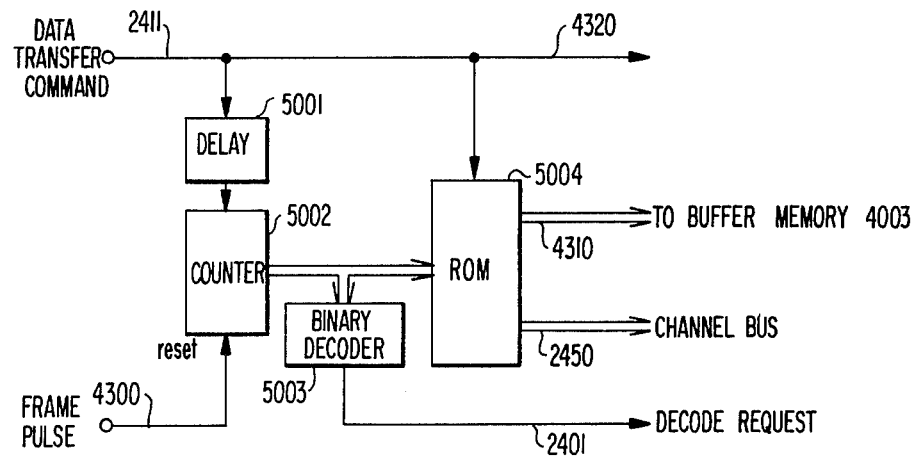
FIG. 5 shows a further more detailed representation of a part of the receiver unit of FIG. 4.

With reference to FIG. 5 which shows the construction of the read address generator 4005 when a single decoder is used, reference numerals 4300, 4310, 2401, 2411 and 2450 have the same meaning as those represented by like numerals in FIG. 4. Reference numeral 5001 designates a delay circuit, numeral 5002 designated a counter, numeral 5003 designates a binary decoder, and numeral 5004 designates a read only memory (ROM). The counter 5002 is reset by the frame pulse 4300 and counts up in response to the data transfer command signal given through the signal line 2411 and the delay circuit 5001. The ROM 5004 is designated by the address represented by an output signal of the counter 5002 and emits an output in response to said data transfer command signal. In the ROM 5004 are programmed and stored the address of the data to be read out of the speech buffer memory 4003 and the number of the channel to which the read out data are to be emitted after decoding. The number of the data to be read out of the memory 4003 of FIG. 4 in every frame is equal to that of channels destined for its own station and is thus predetermined, so that whether or not all the data have been read out can be seen with reference to the contents in the counter 5002. The binary decoder 5003 is provided for that purpose, and when the counter 5002 has reached a predetermined counter value, the output signal from the decoder 5003 is turned "0", so that the sending out of the decode request signal to the signal line 2401 is stopped.

Figure 6:
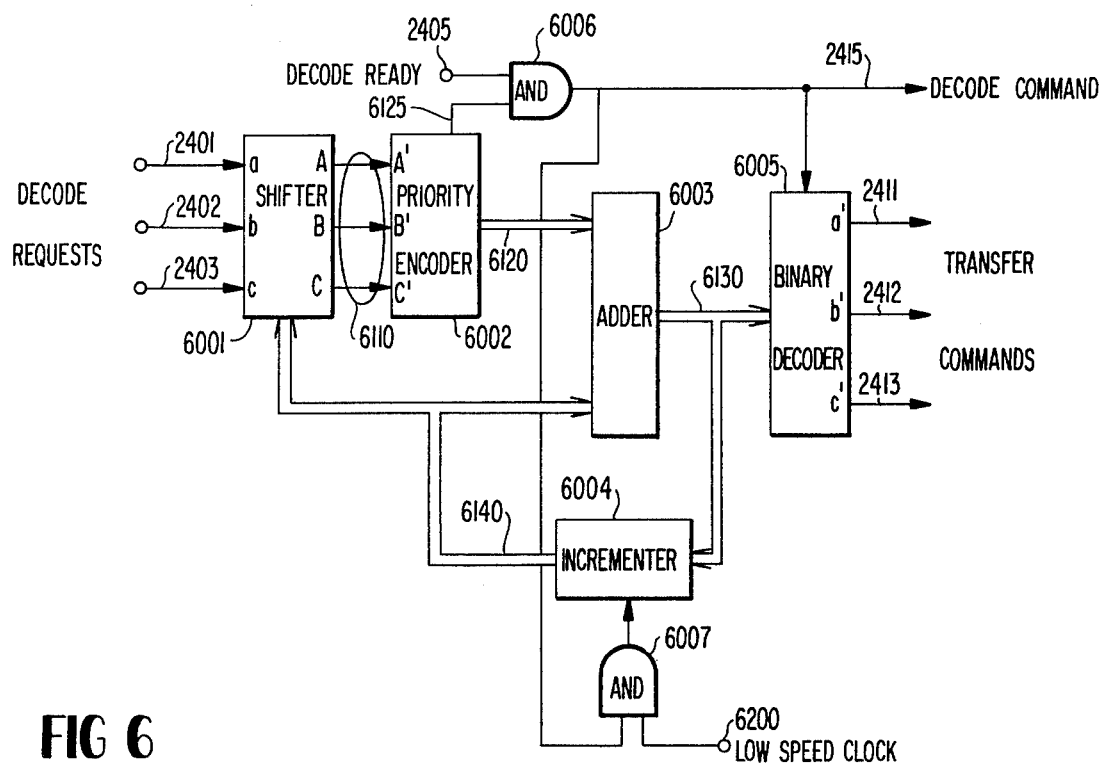
FIG. 6 shows a more detailed representation of a common control unit of FIG. 2.

In FIG. 6 which shows a construction of the common control unit 2004 of FIG. 2, reference numeral 6200 represents a low speed clock input terminal. The illustrated unit 2004 has a shifter 6001, a priority encoder 6002, an adder 6003, an incrementer 6004, a binary decoder 6005, an AND gate 6006 and another AND gate 6007. The shifter 6001 performs the shift operations corresponding to the signal appearing on an output signal line 6140 from the incrementer 6004. More particularly, when the signal appearing on the signal line 6140 (00), the mode of connections in the shifter 6001 is ($a$-A), ($b$-B) and ($c$-C), when the signal is (01), the connection mode is ($b$-A), ($c$-B) and ($a$-C), and when the signal is (10), the connection mode is ($c$-A), ($a$-B) and ($b$-C). The priority encoder 6002 is given with a priority order at its input ports A', B' and C', and so, it is adapted to emit the number of the port having the highest priority when a plurality of input ports are simultaneously in the state of "1". This output signal is fed to an output line 6120 in a binary form. The port A' is given with the signal (00), the port B' the signal (01), and the port C' the signal (10). Still further, only when all the ports are in the state of "0", "0" appears on an output line 6125. The above-described shifter 6001 and priority encoder 6002, respectively, can be realized by those described in the sections entitled "Schottky Four-Bit Shifter with Three-State Outputs" (page 2-109) and "Eight-Input Priority Encoder" (page 3-19) of "Advanced Micro Devices" data published in 1974 by the Advanced Micro Devices, Inc.

The incrementer 6004 is fed with an output signal 6130 of the adder 6003 at its input, and is adapted to emit at its output a value obtained by adding (+1) to this input signal at the next clock time point, so that it can be easily composed of an adder and a register so as to execute addition of modulo ($n$), where $n$ is the number of the receiver units. In the case of the absence of the decode command signal, the incrementer 6004 is inhibited by the output signal of the AND gate 6006 from counting up at the next clock time point.

Here, by way of example, let us assume that the output of the incrementer 6004 is (00), and that among the three inputs $a$, $b$ and $c$ to the shifter 6001, the input $a$ is "0", while the inputs "$b$" and "$c$" are both "1". Then, since the inputs (A', B', C') to the priority encoder 6002 are (0, 1, 1), the port B' is selected, and the signal (01) appears on the output signal line 6120. In the adder 6003, this signal (01) and the output signal (00) of the incrementer 6004 are added and the sum (01) is generated through an output line 6130. The binary decoder 6005 adapted to decode this signal and to send out a data transfer command signal through the second output port $b$. The incrementer 6004 modifies its output to (01) at the next clock time point to lower the priority of the port $b$ of the shifter 6001 whose decode request has been just accepted to the lowest order at the next time, so that the shift is effected in the manner of ($c$-A), ($a$-B) and ($b$-C). So long as no decode request signals are sent from all the receiver units or a decode ready signal is not sent from the common decoder unit 2010 of FIG. 2, the output signal of the AND gate 6006 is "0", and neither the decode command signal nor the data transfer command signal appears at the output. Since the output "0" of the AND gate 6006 inhibits the input of the low speed clock at the AND gate 6007, the stepping operation of the incrementer 6004 is stopped. Consequently, the signal appearing on the signal 6140 is retained at the present state, and the modification of the shift mode in the shifter 6001 is stopped.

From the above description, the construction and operation of the present PCM common decoding apparatus in the case where the decoder unit consists of a single decoder 2005 has been described.

Now the operation principle of the present decoding apparatus will be described with reference to the time chart shown in FIG. 7. In this figure, at $b_1$ is shown a received signal in the $k$-th and ($k$+1)-th frames that is sent from the station 1, and at $b_2$ is shown a received signal in the same frames that is sent from the station 2. Both the received signals $b_1$ and $b_2$ include 16 time slots per frame, among which one time slot is allotted for synchronization and the remaining 15 time slots are allotted for speech transmission. In the received signal $b_1$, the channels 1 to 8 are destined for this received station, while in the received signal $b_2$ the channels 9 to 15 are destined for this received station. At $a_1$ are shown frame pulses for marking frame start points of the received signal $b_1$, and at $a_2$ are shown frame pulses for marking frame start points of the received signal $b_2$. As will be obvious from these frame pulses, the received signal $b_2$ has a higher clock frequency than the received signal $b_1$.

In the receiving station, a receiver unit for the received signal $b_1$ and a receiver unit for the received signal $b_2$ are prepared, and the signals in the channels 1 to 8 of the signal $b_1$ are written in the speech buffer memory 4003 of the receiver unit prepared for the received signal $b_1$, while the signals in the channels 9 to 15 of the signal $b_2$ are written in the speech buffer memory 4003 of the receiver unit prepared for the received signal $b_2$.

Figure 7:
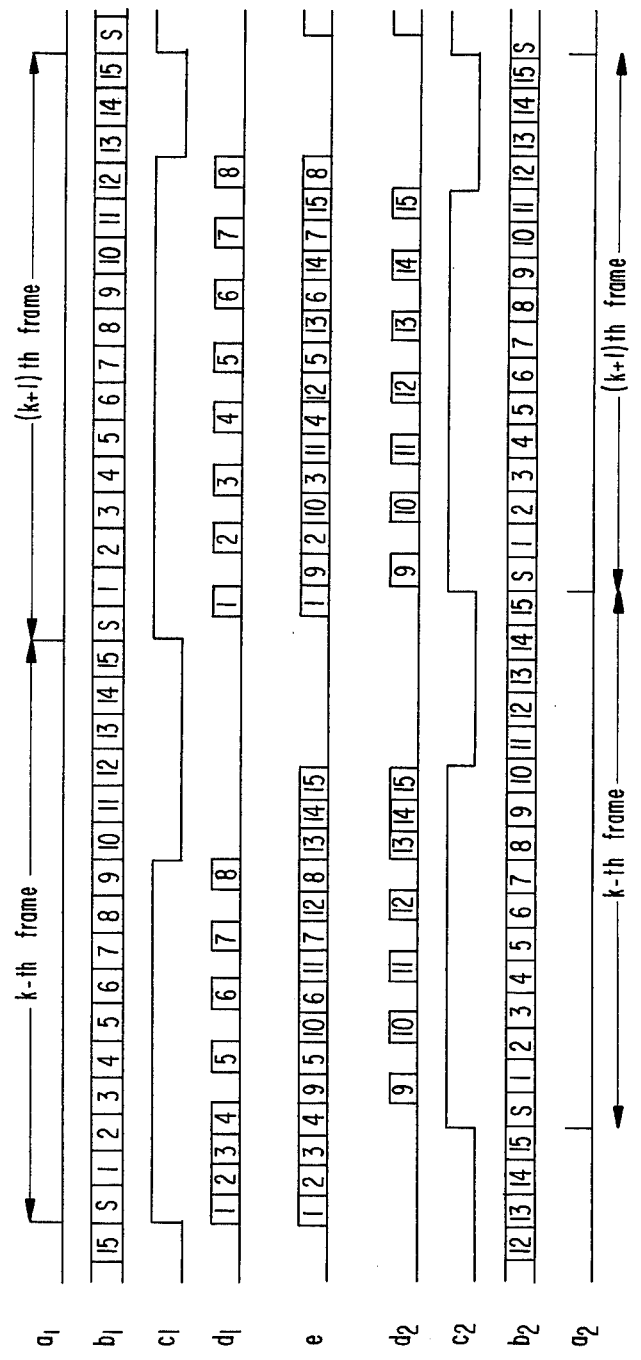
FIG. 7 shows a time chart for explaining operations of the present apparatus.

In response to the renewal of the frame, the memory 4003, which has been in the write-in mode so far, is switched into the read-out-mode, and at the same time, decode request signals are sent out as shown at $c_1$ and $c_2$ of FIG. 7. When the decoding is requested only by either one of the decode request signals $c_1$ and $c_2$, the common control unit 2004 of FIG. 2 allows the requesting receiver unit to continuously use the common decoder unit 2010, but when the decoding is requested simultaneously by both the decode request signals $c_1$ and $c_2$, the unit 2004 allows the respective receiver units to alternately use the unit 2010. At $d_1$ and $d_2$ are shown output signals sent from the respective receiver units to the common PCM bus line 2400. At $e$ is shown a sequence relationship of the channels processed by the common decoder unit 2010. It will be seen from FIG. 7 that because of the difference in clock frequencies between the received signals $b_1$ and $b_2$, the variation in the sequence of decoding of the respective channels occurs when the frame is renewed. However, it is to be noted that all the signals received in one frame are always processed in the next frame and thus a frame slip would never arise. Since a time jitter caused by the variation in the sequence of decoding is also sufficiently small compared with a sampling period of one channel, and further since the practical frequency difference between the respective received signals is of the order of $10^{-4}$ - $10^{-5}$ or less, the effects given upon the decoded signals are very small.

Figure 8:
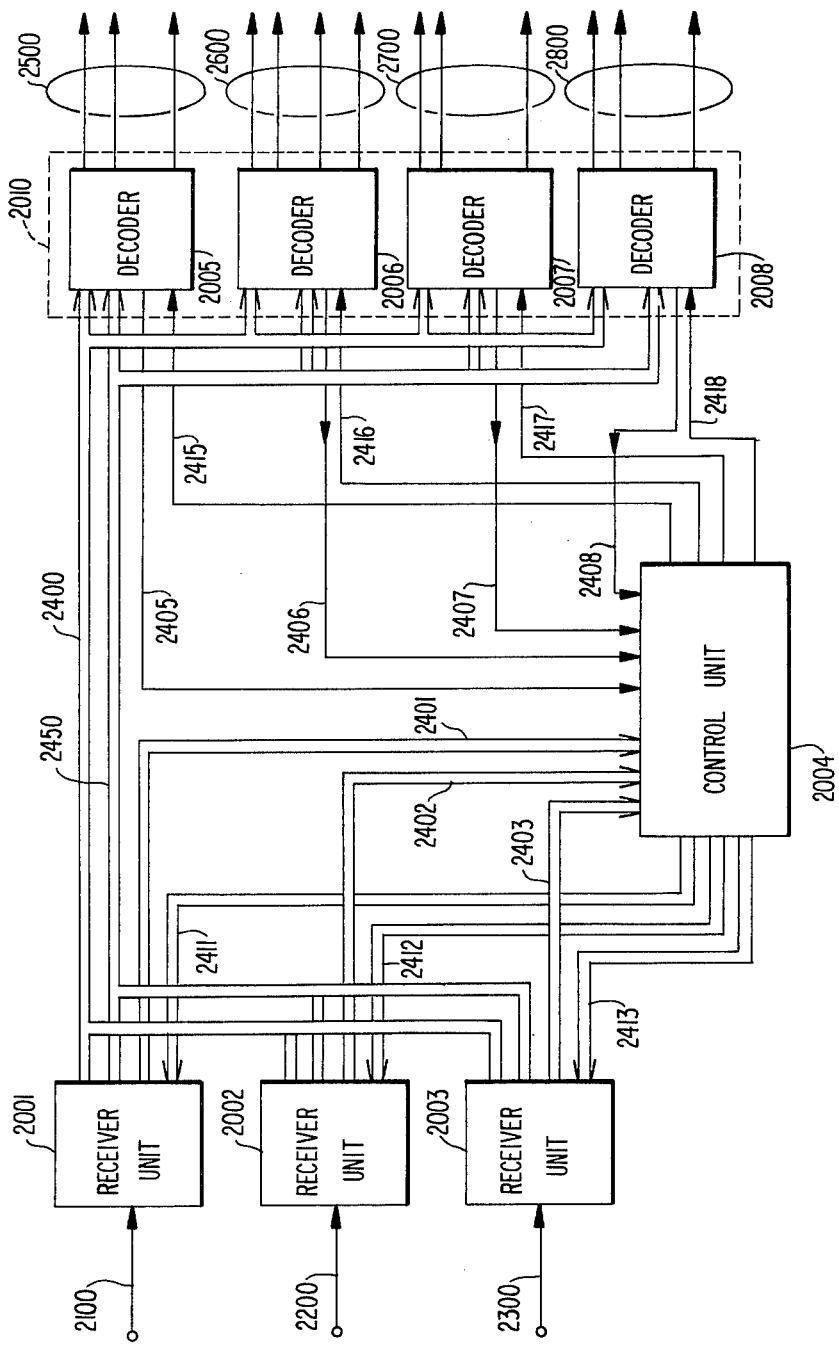
FIG. 8 shows a second embodiment of the present invention.

In FIG. 8 which shows a second embodiment of the present invention, decoders 2006 to 2008 are provided in addition to decoder 2005, so that the constructions of the receiver units 2001 to 2003 and the common control unit 2004 are different from those illustrated in FIG. 2. These differences will be explained in detail as follows.

In the embodiment illustrated in FIG. 8, it is assumed that the number of decoders to be used by the respective receiver units is different for each receiver unit. Accordingly, in some cases, output data of one receiver unit are decoded by only one decoder, and in the other cases, output data of one receiver unit are decoded by a plurality of decoders. Also, in some cases, a certain decoder is occupied by one of the receiver units. Among these cases, in the case where output data of one receiver unit cannot be sent to decoders other than a particular one decoder, the read address generator in that receiver unit could have the same construction as that shown in FIG. 5.

Figure 9:
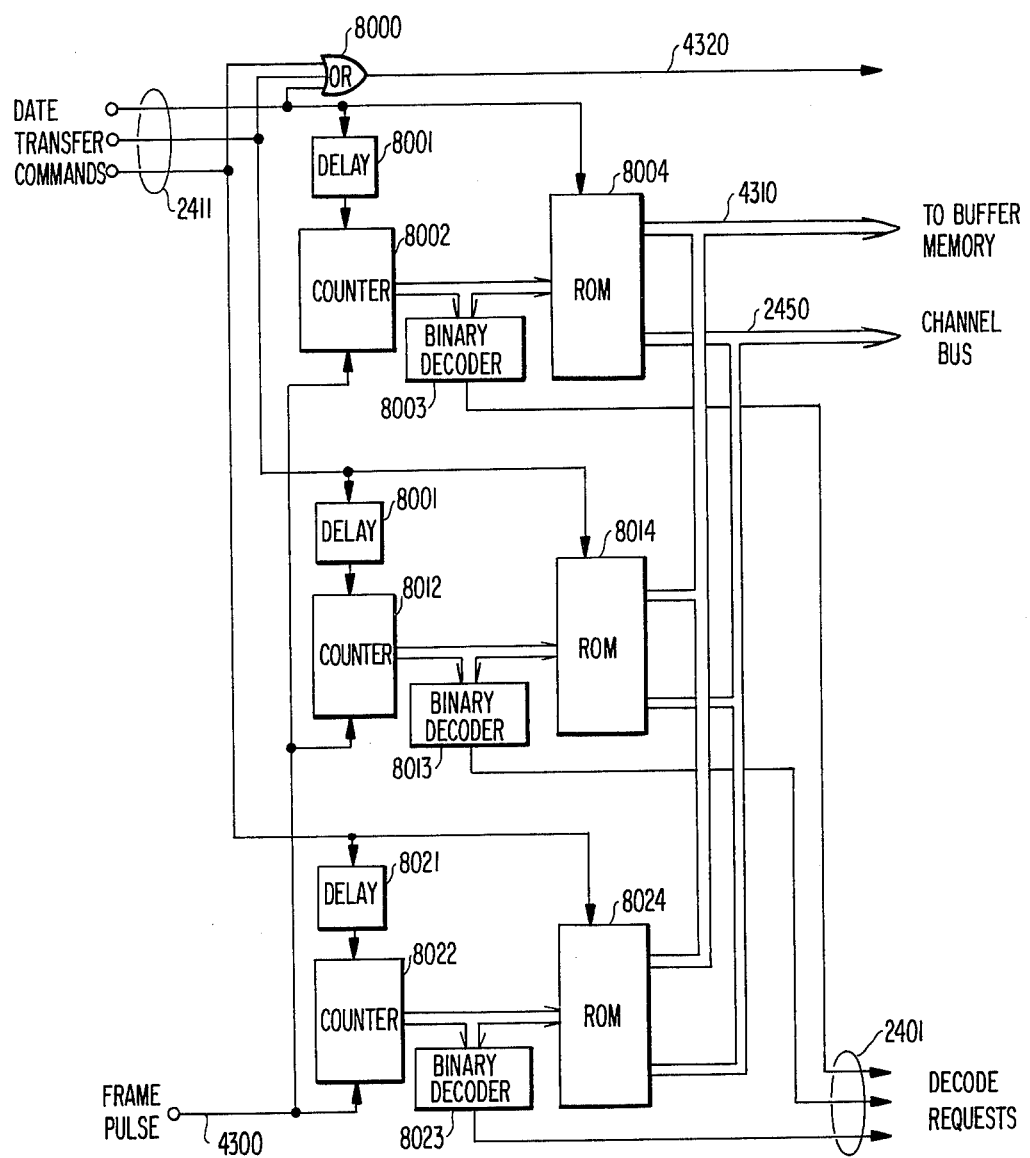
FIG. 9 shows a more detailed representation of a part of a receiver unit of FIG. 8.

FIG. 9 shows the construction of the read address generator for the receiver unit 2001, 2002 or 2003 of FIG. 8 which is adapted to use three decoders. In this figure, reference numerals 80$i$1, 80$i$2, 80$i$3, 80$i$4 ($i$=0, 1, 2), 4300, 4310 and 4320 have the same meaning as those represented by reference numerals 5001, 5002, 5003, 5004, 4300, 4310 and 4320, respectively, in FIG. 5. In this read address generator, three sets of the read address generators of FIG. 5 are prepared corresponding to the respective decoders, and all the outputs of the ROM's 8004, 8014 and 8024 are connected in common. The output enable signal to be fed to the speech buffer memory 4003 (FIG. 4) through the signal line 4320 is generated at an OR gate 8000 by taking an OR logic of the data transfer command signals fed from the common control unit 2004 of FIG. 8 in correspondence to the respective decoders. The decode request signals are individually emitted on the signal line 2401 in correspondence to the respective decoders. The operations of the read address generator shown in FIG. 9 will be apparent from the above description and the description on FIG. 5.

Figure 10:
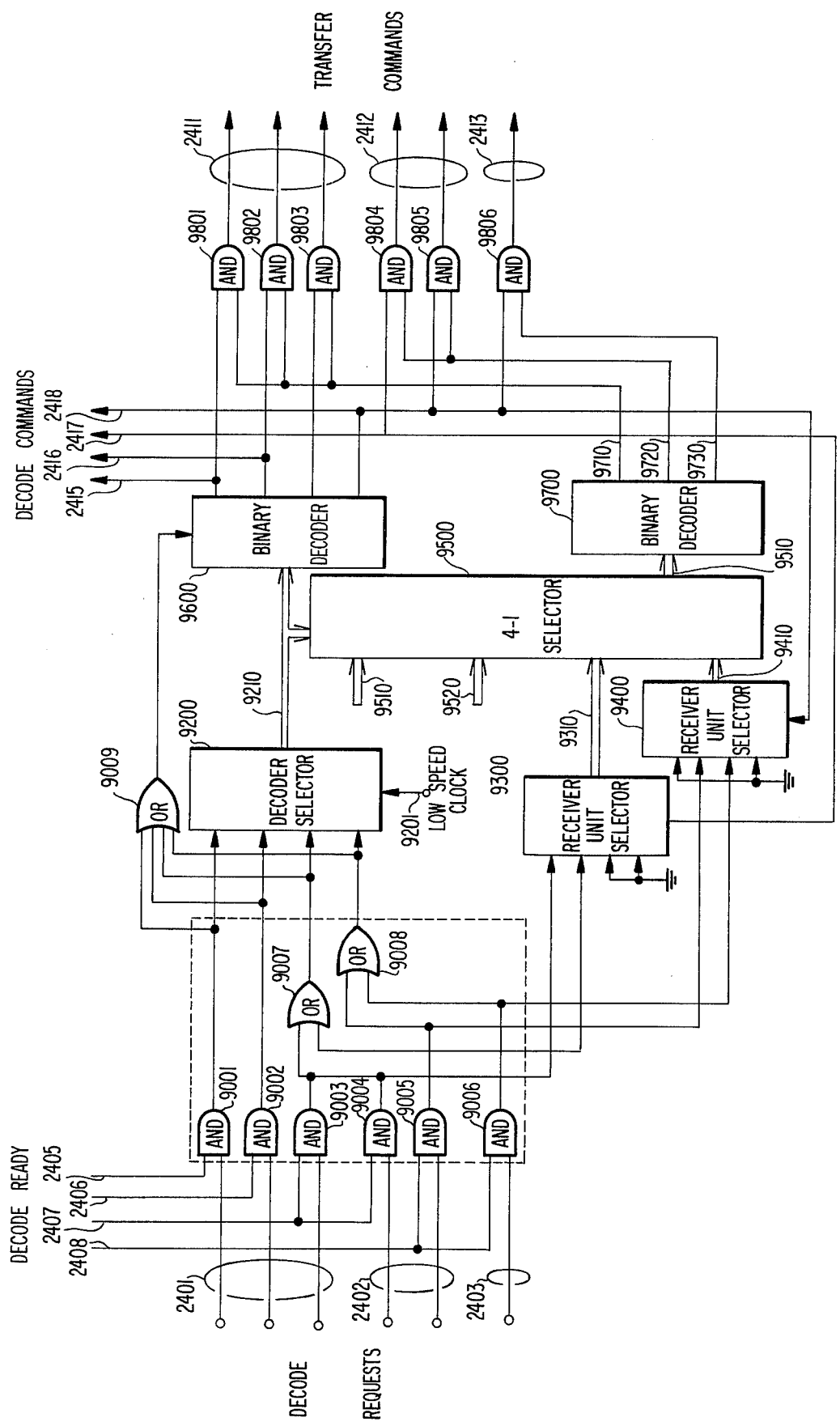
FIG. 10 shows a more detailed representation of a common control unit of FIG. 8.

In FIG. 10 which shows a more detailed construction of the unit 2004 of FIG. 8, it is assumed that the signal of the receiver unit 2001 is decoded by the decoders 2005, 2006 and 2007, the signal of the receiver unit 2002 is decoded by the decoders 2007 and 2008, and the signal of the receiver unit 2003 is decoded by the decoder 2008 only. Accordingly, the signal line 2401 for the decode request signals consists of three wires, the signal line 2402 consists of two wires and the signal line 2403 consists of a single wire, and also the signal lines 2411, 2412 and 2413 for the data transfer command signals consist of three wires, two wires and a single wire, respectively.

In FIG. 10, reference numerals 9001 to 9006 designate AND gates, and reference numerals 9007 to 9009 designate OR gates. The AND gate 9001 emits "1" if the decoder 2005 is in a decode ready state when the receiver unit 2001 requests the decoder 2005, the AND gate 9002 emits "1" if the decoder 2006 is in a decode ready state when the receiver unit 2001 requests the decoder 2006, and the AND gate 9003 emits "1" if the decoder 2007 is in a decode ready state when the receiver unit 2001 requests the decoder 2007. Likewise, the AND gates 9004 to 9006 serve to check the coincidence between the decode request signals given from the respective receiver units 2002 and 2003 and the decode ready signals sent from the decoders requested by said receiver units 2002 and 2003. In the case where an identical decoder is commonly used by two different receiver units, an OR logic of the outputs of the relevant AND gates is taken. That is, the output signals of the AND gates 9003 and 9004 are fed to the inputs of the OR gate 9007, and the output signals from the AND gates 9005 and 9006 are given to the inputs of the OR gate 9008. The output signals of the OR gates 9007 and 9008 serve as allocation request signals for the decoder 2007 and the decoder 2008, respectively. The output signals of the AND gates 9001 and 9002 directly serve as allocation request signals for the decoder 2005 and the decoder 2006, respectively. Therefore, an output signal "0" of the OR gate 9009 implies that allocation requests for any decoder do not exist. A decoder selector 9200 selects one of the allocation request signals for decoders given at its inputs, and the input number corresponding to the selected input is emitted on a signal line 9210. A low speed clock signal supplied to the low speed clock input terminal 9201 serves to decide the selected decoder once per each period of the low speed clock. The selector 9200 is constructed in a similar manner to the circuit shown in FIG. 6 except for the modification that the binary decoder 6005 is omitted and a signal "1" is continuously given to the decode ready signal input line 2405. In addition, it is necessary that the three input signal lines 2401, 2402 and 2403 of FIG. 6 are modified into four input signal lines. The low speed clock input terminal 9201 corresponds to the terminal 6200 of FIG. 6, and the signal line 9210 corresponds to the signal line 6130 of FIG. 6. When the signals on the signal line line 9210 have been decoded by a binary decoder 9600, decode command signals are obtained on the signal lines 2415 to 2418. The binary decoder 9600 is disabled if the OR gate 9009 generates "0," and all the output signals of the binary decoder 9600 are turned "0." Which decoder of the plurality of decoders is to be used, is determined in the above-described manner. What is required next is to determine to which receiver unit a data transfer command signal is to be issued. This direction is made by the remaining circuit portion. It is evident that when either one of the decoders 2005 and 2006 has been selected by the decoder selector 9200, a data transfer command signal could be sent to the receiver unit 2001. However, when the decoder 2007 or 2008 has been selected, the destination of the data transfer command signal is not so self-explanatory. Receiver units having the possibility of requesting the decoder 2007 are the receiver units 2001 and 2002. Accordingly, it is necessary to check which one of the output signals of the AND gates 9003 and 9004 is "1." If they are both "1," it is necessary to select either one of them. A receiver unit selector 9300 carries out this processing. This selector can be realized by the same construction as the decoder selector 9200. If two inputs among the 4 inputs are led from the output signals of the AND circuits 9003 and 9004, respectively, and if the remaining inputs are kept "0," an output signal (00) appears on a signal line 9310 when the receiver unit 2001 is selected, while an output signal (01) appears when the receiver unit 2002 is selected. As will be apparent from the explanation with reference to FIG. 6, this selector 9300 operates in such manner that if only one of the plurality of inputs is "1," the number of said one input may be emitted at its output, while if a plurality of inputs are "1," the lowest priority may be given to the "1" input selected just before and another "1" input may be selected according to the sequence of priority. Reference numeral 9400 also designates a receiver unit selector having exactly the same circuit construction, whose inputs are given with the output signals of the AND gates 9005 and 9006 to uniquelly determine a receive unit requesting the decoder 2008. By maintaining the first input and the last input among the four inputs at "0" and by giving the output signals of the AND gates 9005 and 9006 to the second and third inputs among the four inputs, the selector 9400 produces an output signal (01) corresponding to the receiver unit 2002 on a signal line 9410 and an output signal (10) corresponding to the receiver unit 2003 on the same signal line 9418. To the receiver unit selectors 9300 and 9400 is given a decode command signal in place of the clock signal.

The output signals of the receiver unit selectors 9300 and 9400 are fed to a 4–1 selector 9500. To the other two inputs 9510 and 9520 of the 4–1 selector 9500 is applied a stationary signal (00) in correspondence to the receiver unit 2001 occupying the decoders 2005 and 2006. Upon supply of the output signal of the above-described decoder selector 9200 to the selection signal input of the 4–1 selector 9500, a signal for representing the number of a receiver unit corresponding to the decoder number generated on the signal line 9210 appears on the signal line 9510. Reference numeral 9700 designates a binary decoder generating a signal "1" on one of signal lines 9710, 9720 and 9730 in response to the input signal produced on the signal line 9510. More particularly, if a signal (00) appears on the signal line 9510, only the signal line 9710 is turned to "1." If a signal (01) appears on the signal line 9510, only the signal line 9720 is turned to "1," and if a signal (10) appears on the signal line 9510, only the signal line 9730 is turned to "1."

Data transfer command signals to be given to the respective receiver units are obtained by making the output signals of the binary decoders 9600 and 9700 pass through AND gates 9801 through 9806, respectively. In case where the receiver unit 2001 has been selected, the signal line 9710 is turned to "1," so that an output of any one of the AND gates 9801 to 9803 is turned to "1" depending upon which one of the decoders 2005, 2006 and 2007 has been selected. Likewise, upon selection of the receiver unit 2002, the signal line 9720 is turned to "1," so that the output of either one of the AND gates 9804 and 9805 is turned to "1" depending upon which one of the decoders 2007 and 2008 has been selected. If the receiver unit 2003 has been selected, the output of the AND gate 9806 is turned to "1," so that a data transfer command signal is sent to the receiver unit 2003. It is to be noted that in the above-described respective figures a signal line represented by a thick line implies that said signal line consists of a plurality of wires for conveying a plurality of parallel signals.

As described in detail above, in the present invention, it is possible to receive a plurality of PCM signals asynchronous to each other and to decode them into analog signals by means of a decoder unit without causing a frame slip. Such a technique has not been known in the prior art, and heretofore, there was no way except for the method in which a decoder is prepared individually for each received signal or received signals are allowed to pass through a common decoder after they have been forcibly synchronized through a frame slip. Therefore, the advantage obtained by the present invention is extremely great.

While specific numbers, such as three for the number of the receiver units, have been assumed in the above description, it should be clearly understood that this has been made for convenience of explanation and the scope of the present invention should not be limited by these numbers.

What is claimed is:

1. An asynchronous PCM common decoding apparatus in which a plurality of time division multiplexed digital signals asynchronous to each other are received and decoded, comprising:
   a plurality of receiver means for generating at the output of each said receiver means, a digital signal to be decoded, a channel-number-designating signal for designating the number of the channel to which an analog signal obtained from the decoding of said digital signal is to be fed, and a decode-requesting signal for requesting the decoding of said digital signal,
   one or more decoder means for producing at the output of each said decoder means a status signal for representing that said digital signals given from one of said receiver means are acceptable, and
   a common control means responsive to said request signals given from said receiver means and said status signals given from said one or more decoder means, for successively alotting a combination of a given receiver means and a given decoder means and for sending a data transfer command signal to the allotted receiver means so that said digital signal to be decoded and said channel-number-designating signal may be transferred from the allotted receiver means to the alotted decoder means and also sending decode command signals to said allotted decoder means.

2. An asynchronous PCM common decoding apparatus as recited in claim 1 wherein said one or more means each comprise:
   first storage means for storing a digital signal from one of said receiver means,
   second storage means for storing a channel-number designating signal from said one of said receiver means,
   a digital-to-analog converter means connected to said first storage means for converting said digital signals to an analog signal,
   channel selection means connected to said second storage means and the output of said digital-to-analog converter means for routing said analog signal to the channel designated by said channel-number-designating signal, and
   first timing means responsive to said decode command signal for setting said first and second storage means to receive said digital signal and said channel-number-designating signal, resetting said first and second storage means after said digital signal has been converted to an analog signal and routed to the designated channel and thereafter generating said status signal to said common control means.

3. An asynchronous PCM common decoding apparatus as recited in claim 2 wherein said channel selection means comprises:
   a binary converter means connected to said second storage means for generating a single output on a plurality of output lines, and
   a plurality of channel output circuits each controlled by a corresponding one of said plurality of output lines from said binary converter and all receiving said analog signal as an input.

4. An asynchronous PCM common decoding apparatus as recited in claim 2 wherein said timing means comprises:
   a shift register means having a plurality of stages and connected to receive said decode command signal and shift the signal through said plurality of stages under the control of clock pulses, selected stages being connected to said first and second storage means to provide set and reset signals to said first and second storage means, and
   logic means connected to selected stages of said shift register for generating said status signal.

5. An asynchronous PCM common decoding apparatus as recited in claim 2 wherein each of said receiver units comprise:
   buffer memory means for storing and reading out PCM data signals,
   a write address generator means connected to said buffer memory means for designating the addresses for storing input PCM data signals,
   a read address generator means connected to said buffer memory means responsive to said data transfer command signal for designating the address for reading out said digital signal to said one or more decoder means, said read address generator means also generating said channel-number-designating signal and said decoder-requesting signal, and
   second timing means responsive to input PCM data signals for generating a synchronizing frame pulse for said buffer memory means and said read address generator means and timing signals for said write address generator means.

6. An asynchronous PCM common decoding apparatus as recited in claim 5 wherein said buffer memory means comprises:
   a serial-to-parallel converter means for receiving serial PCM data signals and providing parallel output digital signals, and
   first and second parallel memory stack means connected to said serial-to-parallel converter and responsive to said frame pulse for switching alternately between a write mode and a read mode every frame.

7. An asynchronous PCM common decoding apparatus as recited in claim 5 wherein said write address generator means is a read only memory whose address is designated by a time slot designation signal from said second timing means.

8. An asynchronous PCM common decoding apparatus as recited in claim 5 wherein said write address generator means is a random access memory whose contents are changed by data received by said receiver unit.

9. An asynchronous PCM common decoding apparatus as recited in claim 5 wherein said read address generator means comprises:

at least one counter reset by said frame pulse and responsive to said data transfer command signals for accumulating a count, channel address means responsive to the count accumulated in said at least one counter for generating signals designating addresses in said buffer memory means and also generating said channel-number-designating signals, and at least one decode request means also responsive to the count accumulated in said at least one counter for generating said decode-requesting signal until a predetermined count is accumulated in said at least one counter.

10. An asynchronous PCM common decoding apparatus as recited in claim 9 wherein said channel address means comprises at least one read only memory whose address is designated by the count accumulated in said at least one counter.

11. An asynchronous PCM common decoding apparatus as recited in claim 2 wherein said common control means comprises:

priority encoding means for receiving the decode request signals of each of said plurality of receiver means and generating numbers designating the receiver means having the highest priorities among those receiver means producing decode request signals simultaneously, decode command means responsive to said status signals from said one or more means and enabled by said priority encoding means for generating said decode command signals, incrementing means enabled by said decode command signal for periodically incrementing the numbers generated by said priority encoding means and shifting the priorities among at least some of said plurality of receiver means, and .

transfer command means responsive to the number generated by said priority encoding means for generating data transfer command signals to the receiver means designated by said number.

* * * * *